US012183994B2

(12) United States Patent
Deng et al.

(10) Patent No.: US 12,183,994 B2
(45) Date of Patent: Dec. 31, 2024

(54) ANTENNA STRUCTURE

(71) Applicant: Quanta Computer Inc., Taoyuan (TW)

(72) Inventors: Ying-Cong Deng, Taoyuan (TW); Chung-Ting Hung, Taoyuan (TW); Chin-Lung Tsai, Taoyuan (TW); Yi-Ling Tseng, Taoyuan (TW); Yu-Chen Zhao, Taoyuan (TW); Yi-Chih Lo, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 170 days.

(21) Appl. No.: 18/153,730

(22) Filed: Jan. 12, 2023

(65) Prior Publication Data

US 2024/0195066 A1 Jun. 13, 2024

(30) Foreign Application Priority Data

Dec. 7, 2022 (TW) .................................. 111146916

(51) Int. Cl.

*H01Q 5/371* (2015.01)
*H01Q 1/48* (2006.01)
*H01Q 7/00* (2006.01)

(52) U.S. Cl.

CPC ................. *H01Q 7/00* (2013.01); *H01Q 1/48* (2013.01); *H01Q 5/371* (2015.01)

(58) Field of Classification Search

CPC ............................... H01Q 5/364; H01Q 5/371
See application file for complete search history.

(56) References Cited

U.S. PATENT DOCUMENTS 11,996,633 B2 * 5/2024 Cheng .................... H01Q 1/273
2005/0212706 A1 * 9/2005 Ying .................... H01Q 19/005 343/702
2018/0048076 A1 * 2/2018 Wei ........................ H01Q 21/30
2024/0047864 A1 * 2/2024 Chen ........................ H01Q 9/42
2024/0195082 A1 * 6/2024 Lo .......................... H01Q 5/378

FOREIGN PATENT DOCUMENTS

TW 201411937 A 3/2014

OTHER PUBLICATIONS

TW Office Action dated Nov. 10, 2023 in Taiwan application No. 111146916.
Search Report issued in TW Office Action dated Nov. 10, 2023 in Taiwan application No. 111146916.

* cited by examiner

*Primary Examiner* — Daniel Munoz
(74) *Attorney, Agent, or Firm* — McClure, Qualey & Rodack, LLP

(57) ABSTRACT

An antenna structure includes a main ground plane, a protruding ground plane, a feeding radiation element, a connection radiation element, a shorting radiation element, a first radiation element, and a second radiation element. The protruding ground plane is coupled to the main ground plane. The feeding radiation element has a feeding point. The connection radiation element is coupled to the feeding radiation element. The connection radiation element is further coupled through the shorting radiation element to the protruding ground plane. The first radiation element is coupled to the feeding radiation element. The second radiation element is coupled to the connection radiation element. The protruding ground plane further includes an extension portion. The first radiation element is adjacent to the extension portion of the protruding ground plane.

9 Claims, 2 Drawing Sheets

ANTENNA STRUCTURE

CROSS REFERENCE TO RELATED APPLICATIONS

This application claims priority of Taiwan Patent Application No. 111146916 filed on Dec. 7, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHZ, 1800 MHZ, 1900 MHZ, 2100 MHZ, 2300 MHz, and 2500 MHz. Some devices cover a small wireless communication area; these include mobile phones using Wi-Fi systems and using frequency bands of 2.4 GHz, 5.2 GHZ, and 5.8 GHz.

Antennas are indispensable elements for wireless communication. If an antenna for signal reception and transmission has insufficient operational bandwidth, it may affect the communication quality of the mobile device in which it is installed. Accordingly, it has become a critical challenge for antenna designers to design a small-size, wideband antenna structure.

BRIEF SUMMARY OF THE INVENTION

In an exemplary embodiment, the invention is directed to an antenna structure that includes a main ground plane, a protruding ground plane, a feeding radiation element, a connection radiation element, a shorting radiation element, a first radiation element, and a second radiation element. The protruding ground plane is coupled to the main ground plane. The feeding radiation element has a feeding point. The connection radiation element is coupled to the feeding radiation element. The connection radiation element is further coupled through the shorting radiation element to the protruding ground plane. The first radiation element is coupled to the feeding radiation element. The second radiation element is coupled to the connection radiation element. The protruding ground plane further includes an extension portion. The first radiation element is adjacent to the extension portion of the protruding ground plane.

In some embodiments, the combination of the feeding radiation element, the connection radiation element, and the shorting radiation element substantially has a loop shape for surrounding a slot region.

In some embodiments, the slot region substantially has an L-shape.

In some embodiments, each of the first radiation element and the second radiation element substantially has a straight-line shape.

In some embodiments, the second radiation element and the first radiation element substantially extend in opposite directions.

In some embodiments, a coupling gap is formed between the first radiation element and the extension portion of the protruding ground plane. The width of the coupling gap is from 0.1 mm to 1 mm.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the feeding radiation element, the connection radiation element, and the shorting radiation element is substantially equal to 0.25 wavelength of the first frequency band.

In some embodiments, the total length of the feeding radiation element, the connection radiation element, and the second radiation element is substantially equal to 0.25 wavelength of the second frequency band.

In some embodiments, the total length of the feeding radiation element and the first radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
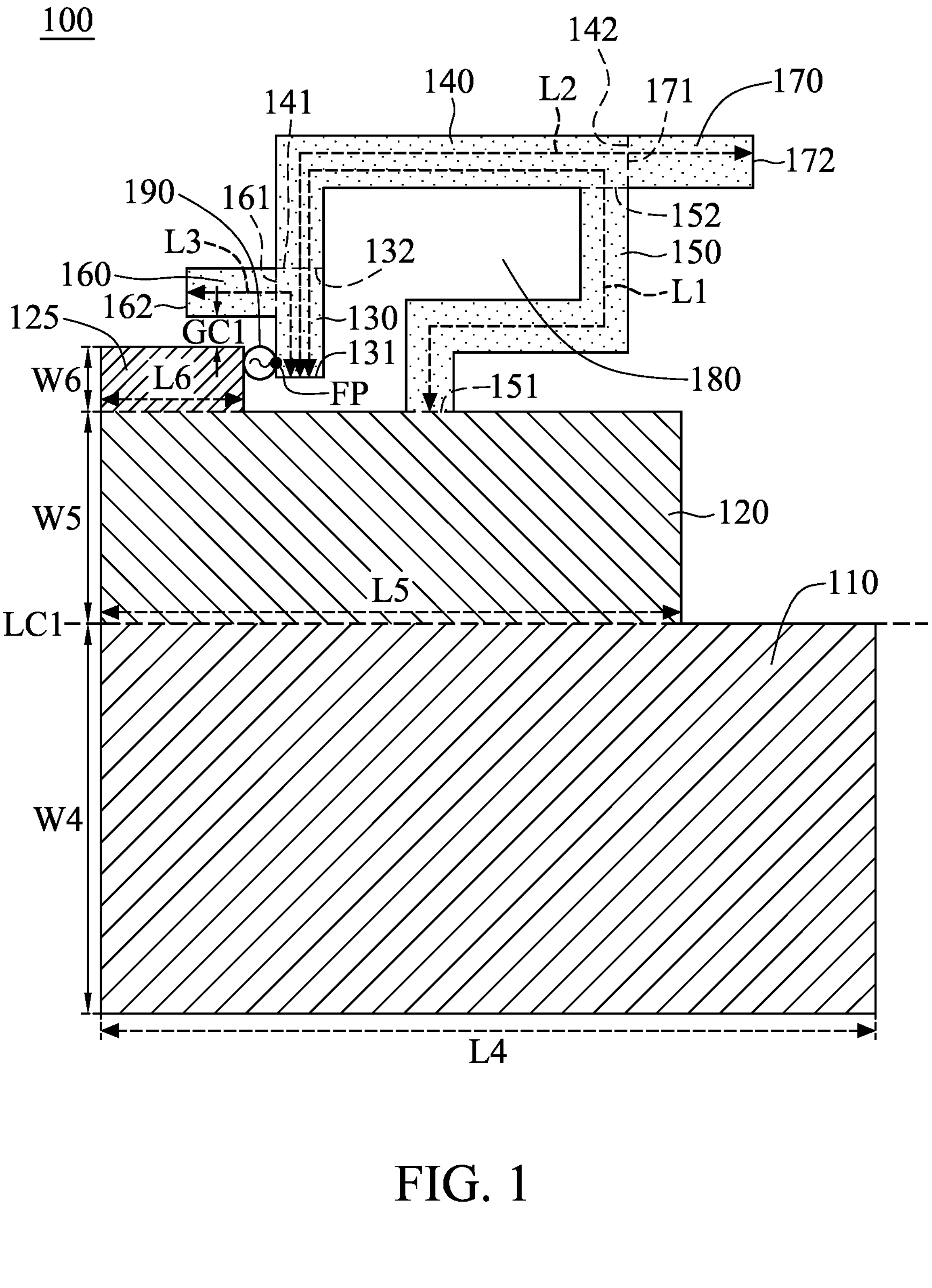
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. For example, the antenna structure 100 may be used in a mobile device such as a smartphone, a tablet computer, a notebook computer, a wireless access point, a router, or any other device with a communication function. Alternatively, the antenna structure 100 may be applied to an IOT (Internet of Things)-enabled smart device.

As shown in FIG. 1, the antenna structure 100 includes a main ground plane 110, a protruding ground plane 120, a feeding radiation element 130, a connection radiation element 140, a shorting radiation element 150, a first radiation element 160, and a second radiation element 170. The main ground plane 110, the protruding ground plane 120, the feeding radiation element 130, the connection radiation element 140, the shorting radiation element 150, the first radiation element 160, and the second radiation element 170 may all be made of metal materials, such as copper, silver, aluminum, iron, or an alloy thereof.

The main ground plane 110 may substantially have a relatively large rectangular shape. The protruding ground plane 120 may substantially have a relatively median rectangular shape. The protruding ground plane 120 is coupled to the main ground plane 110. In addition, the protruding ground plane 120 further includes an extension portion 125, which may substantially have a relatively small rectangular shape. As a whole, the combination of the main ground plane 110, the protruding ground plane 120, and its extension portion 125 may substantially have a stair shape.

In some embodiments, the antenna structure 100 is a planar antenna structure. However, the invention is not limited thereto. In alternative embodiments, the antenna structure 100 is adjusted along a bending line LC1, such that the protruding ground plane 120 can be substantially perpendicular to the main ground plane 110. In other words, the antenna structure 100 can be modified to a 3D (Three-Dimensional) antenna structure, depending on requirements.

The feeding radiation element 130 may substantially have a straight-line shape. Specifically, the feeding radiation element 130 has a first end 131 and a second end 132. A feeding point FP is positioned at the first end 131 of the feeding radiation element 130. The feeding point FP may be further coupled to a signal source 190. For example, the signal source 190 may be an RF (Radio Frequency) module for exciting the antenna structure 100. In some embodiments, a positive electrode of the signal source 190 is coupled to the feeding point FP, and a negative electrode of the signal source 190 is coupled to the extension portion 125 of the protruding ground plane 120.

The connection radiation element 140 may substantially have an L-shape. Specifically, the connection radiation element 140 has a first end 141 and a second end 142. The first end 141 of the connection radiation element 140 is coupled to the second end 132 of the feeding radiation element 130.

The shorting radiation element 150 may substantially have an N-shape. Specifically, the shorting radiation element 150 has a first end 151 and a second end 152. The first end 151 of the shorting radiation element 150 is coupled to the protruding ground plane 120. The second end 152 of the shorting radiation element 150 is coupled to the second end 142 of the connection radiation element 140. That is, the connection radiation element 140 is further coupled through the shorting radiation element 150 to the protruding ground plane 120.

The first radiation element 160 may substantially have a relatively short straight-line shape, which may be substantially perpendicular to the feeding radiation element 130. Specifically, the first radiation element 160 has a first end 161 and a second end 162. The first end 161 of the first radiation element 160 is coupled to the second end 132 of the feeding radiation element 130. The second end 162 of the first radiation element 160 is an open end. The first radiation element 160 is adjacent to the extension portion 125 of the protruding ground plane 120. In some embodiments, a coupling gap GC1 is formed between the first radiation element 160 and the extension portion 125 of the protruding ground plane 120. It should be noted that the term “adjacent” or “close” over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The second radiation element 170 may substantially have a relatively long straight-line shape (in comparison to the first radiation element 160). Specifically, the second radiation element 170 has a first end 171 and a second end 172. The first end 171 of the second radiation element 170 is coupled to the second end 142 of the connection radiation element 140. The second end 172 of the second radiation element 170 is an open end. For example, the second end 172 of the second radiation element 170 and the second end 162 of the first radiation element 160 may substantially extend in opposite directions and away from each other.

In some embodiments, the combination of the feeding radiation element 130, the connection radiation element 140, and the shorting radiation element 150 substantially has a loop shape for surrounding a slot region 180. For example, the slot region 180 may substantially have an L-shape, but it is not limited thereto. It should be noted that there is no metal element disposed inside the slot region 180.

In some embodiments, the antenna structure 100 is disposed on a dielectric substrate (not shown). For example, the aforementioned dielectric substrate may be an FR4 (Flame Retardant 4) substrate, a PCB (Printed Circuit Board), or an FPC (Flexible Printed Circuit).

Figure 2:
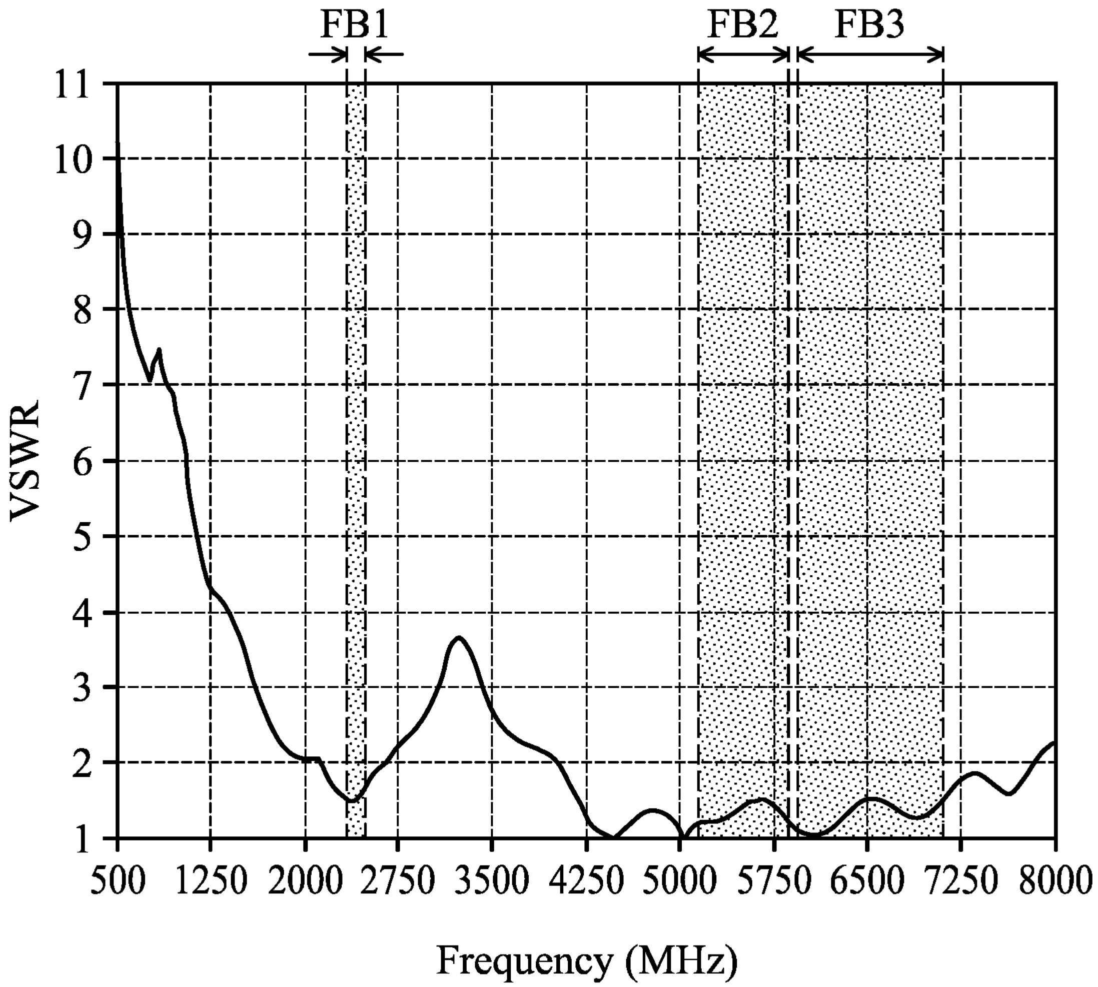
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the antenna structure 100 can support the wide-band operations of the conventional WLAN (Wireless Local Area Network) and the next-generation Wi-Fi 6E.

In some embodiments, the operational principles of the antenna structure 100 will be described as follows. The feeding radiation element 130, the connection radiation element 140, and the shorting radiation element 150 are excited to generate the aforementioned first frequency band FB1. The feeding radiation element 130, the connection radiation element 140, and the second radiation element 170 are excited to generate the aforementioned second frequency band FB2. In addition, the feeding radiation element 130 and the first radiation element 160 are excited to generate the aforementioned third frequency band FB3. It should be noted that the radiation performance of the antenna structure 100 is not negatively affected so much by surrounding metal elements since the feeding radiation element 130, the connection radiation element 140, and the shorting radiation element 150 are almost considered as a loop-shaped radiator. According to practical measurements, the protruding ground plane 120 is configured to fine-tune the impedance matching of the second frequency band FB2, thereby increasing the operational bandwidth of the second frequency band FB2. Also, the extension portion 125 of the protruding ground plane 120 is configured to fine-tune the impedance matching of the third frequency band FB3, thereby increasing the operational bandwidth of the third frequency band FB3.

In some embodiments, the element sizes of the antenna structure 100 will be described as follows. The total length L1 of the feeding radiation element 130, the connection radiation element 140, and the shorting radiation element 150 may be substantially equal to 0.25 wavelength (24) of the first frequency band FB1 of the antenna structure 100. The total length L2 of the feeding radiation element 130, the connection radiation element 140, and the second radiation element 170 may be substantially equal to 0.25 wavelength (24) of the second frequency band FB2 of the antenna structure 100. The total length L3 of the feeding radiation element 130 and the first radiation element 160 may be substantially equal to 0.25 wavelength ($\lambda/4$) of the third frequency band FB3 of the antenna structure 100. The width of the coupling gap GC1 may be from 0.1 mm to 1 mm. The length L4 of the main ground plane 110 may be from 24 mm to 36 mm. The width W4 of the main ground plane 110 may be from 8 mm to 18 mm. The length L5 of the protruding ground plane 120 may be from 18 mm to 26 mm. The width W5 of the protruding ground plane 120 may be from 6 mm to 10 mm. The length L6 of the extension portion 125 may be from 4 mm to 7 mm. The width W6 of the extension portion 125 may be from 1 mm to 3 mm. The above ranges of element sizes are calculated and obtained according to many experiment results, and they help to optimize the operational bandwidth and impedance matching of the antenna structure 100.

In some embodiments, the aforementioned antenna structure 100 is applied in a POS (Point of Sale) system (not shown). Since the POS system includes the aforementioned antenna structure 100, the POS system can support the function of wireless communication. In some embodiments, the POS system further includes an RF circuit, a filter, an amplifier, a processor, and/or a housing, but it is not limited thereto.

The invention proposes a novel antenna structure. In comparison to the conventional design, the invention has at least the advantages of small size, wide bandwidth, low manufacturing cost, and being used in different environments. Therefore, the invention is suitable for application in a variety of mobile communication devices or the IOT.

Note that the above element sizes, element shapes, and frequency ranges are not limitations of the invention. An antenna designer can fine-tune these settings or values, depending on requirements. It should be understood that the antenna structure of the invention is not limited to the configurations of FIGS. 1 and 2. The invention may merely include any one or more features of any one or more embodiments of FIGS. 1 and 2. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
a main ground plane;
a protruding ground plane, coupled to the main ground plane;
a feeding radiation element, having a feeding point;
a connection radiation element, coupled to the feeding radiation element;
a shorting radiation element, wherein the connection radiation element is further coupled through the shorting radiation element to the protruding ground plane;
a first radiation element, coupled to the feeding radiation element; and
a second radiation element, coupled to the connection radiation element;
wherein the protruding ground plane further comprises an extension portion, and the first radiation element is adjacent to the extension portion;
wherein a coupling gap is formed between the first radiation element and the extension portion of the protruding ground plane, and a width of the coupling gap is from 0.1 mm to 1 mm.

2. The antenna structure as claimed in claim 1, wherein a combination of the feeding radiation element, the connection radiation element, and the shorting radiation element substantially has a loop shape for surrounding a slot region.

3. The antenna structure as claimed in claim 2, wherein the slot region substantially has an L-shape.

4. The antenna structure as claimed in claim 1, wherein each of the first radiation element and the second radiation element substantially has a straight-line shape.

5. The antenna structure as claimed in claim 1, wherein the second radiation element and the first radiation element substantially extend in opposite directions.

6. The antenna structure as claimed in claim 1, wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

7. The antenna structure as claimed in claim 6, wherein a total length of the feeding radiation element, the connection radiation element, and the shorting radiation element is substantially equal to 0.25 wavelength of the first frequency band.

8. The antenna structure as claimed in claim 6, wherein a total length of the feeding radiation element, the connection radiation element, and the second radiation element is substantially equal to 0.25 wavelength of the second frequency band.

9. The antenna structure as claimed in claim 6, wherein a total length of the feeding radiation element and the first radiation element is substantially equal to 0.25 wavelength of the third frequency band.

* * * * *